United States Patent [19]

Ishise

[11] 4,289,721
[45] Sep. 15, 1981

[54] METHOD OF CONNECTING CABLES

[75] Inventor: Kojiro Ishise, Osaka, Japan

[73] Assignee: Sumitomo Electric Industries, Ltd., Osaka, Japan

[21] Appl. No.: 207,550

[22] Filed: Nov. 17, 1980

Related U.S. Application Data

[63] Continuation of Ser. No. 58,396, Jul. 17, 1979, abandoned.

[30] Foreign Application Priority Data

Jul. 17, 1978 [JP] Japan ............................. 53-87530
Aug. 26, 1978 [JP] Japan ............................. 53-104017
Oct. 23, 1978 [JP] Japan ............................. 53-130748
May 23, 1979 [JP] Japan ............................. 54-64515

[51] Int. Cl.³ .................................... B29C 6/04
[52] U.S. Cl. ........................... 264/85; 174/DIG. 8; 264/230; 264/255; 264/263
[58] Field of Search ............ 264/230, 263, DIG. 71, 264/85, 255, 261; 174/DIG. 8

[56] References Cited

U.S. PATENT DOCUMENTS 2,716,623  8/1955  Tator ............................. 264/263
3,691,505  9/1972  Graves ........................ 174/DIG. 8
4,144,404  3/1979  DeGroef et al. ............ 174/DIG. 8

FOREIGN PATENT DOCUMENTS 42-1267 of 1967 Japan ............................. 264/263
606963 of 1948 United Kingdom ............. 264/230

Primary Examiner—James B. Lowe
Attorney, Agent, or Firm—Sughrue, Mion, Zinn, Macpeak & Seas

[57] ABSTRACT

A method of connecting two cables where a reinforcing insulation layer is formed over a connection part of the conductors of the cables. A heat-shrinkable tube is provided on the reinforcing insulation layer by heating the heat-shrinkable tube to form a cable connection part. The cable connection part is shaped by heating while being pressurized in a fluid medium.

19 Claims, 3 Drawing Figures

METHOD OF CONNECTING CABLES

This is a continuation, of application Ser. No. 58,396, filed July 17, 1979, now abandoned.

BACKGROUND OF THE INVENTION

This invention relates to an improvement of a method of connecting rubber or polyethylene insulation cables.

In the connection part of rubber or plastic (polyethylene, crosslinked polyethylene, etc.) insulation cables, after the conductors are connected, an internal semiconductive layer, a reinforcing insulation layer and, if necessary, an external semiconductive layer are formed on the conductor connection part in the stated order. Then, the cable connection part is heated under pressure so that the cable insulation layers and the reinforcing insulation layer form one unit. A method has been extensively employed to form the reinforcing insulation layer, in which the reinforcing insulation layer is formed by winding a tape of polymer material such as polyethylene, crosslinked polyethylene, or etylene-propylene copolymer or by pouring the same polymer material into a metal mold. Then it is heated under pressure to become integral with the cable insulation layers.

In one example of a conventional method of heating the reinforcing insulation layer under pressure, a vulcanized rubber tape is strongly wound on the reinforcing insulation layer to pressurize the latter, and under this condition it is heated by an electric heater or the like. However, the method is disadvantageous in the following respect. That is, when the vulcanized rubber tape is removed from the reinforcing insulation layer after heating, marks from the laps of the vulcanized rubber tape remain on the surface of the reinforcing insulation layer. Accordingly, it is necessary to polish the surface of the reinforcing insulation layer. Also, the reinforcing insulation layer is heated through the vulcanized rubber tape wound thereon and it takes a relatively long time to heat the reinforcing insulation layer.

In another example of a conventional method of heating the reinforcing insulation layer under pressure, the reinforcing insulation layer is heated and shaped by using the metal mold, when used for forming the reinforcing insulation layer by pouring the polymer material thereinto. In the method also, the marks of the joint of the metal mold remain on the surface of the molded reinforcing insulation layer. Therefore it is necessary to polish the surface of the reinforcing insulation layer.

In the case where, in connecting cables, it is necessary to provide the external semiconductive layer on the reinforcing insulation layer, the following method has been employed. That is, after the reinforcing insulation layer is heated under pressure, the surface thereof is polished to be smooth. Thereafter, a semiconductive tape is wound on the reinforcing insulation layer and is then heated to provide the external semiconductive layer. Therefore, it takes a longer time to achieve cable connection.

SUMMARY OF THE INVENTION

Accordingly, an object of this invention is to eliminate the above-described difficulties accompanying conventional cable connecting methods.

More specifically, an object of the invention is to provide a cable connecting method in which after a reinforcing insulation layer is formed by winding a tape of insulation material or by pouring the same material into a mold, a heat-shrinkable insulation tube, or a heat-shrinkable semiconductive tube when it is necessary to provide an external semiconductive layer on the cable connection part, is placed on the reinforcing insulation layer by heating the tube. Furthermore, the cable connection part thus formed is heated under fluid pressure.

According to the method of the invention, it is unnecessary to polish the surface of the reinforcing insulation layer, and in the case where it is necessary to provide the external semiconductive layer on the reinforcing insulation material, it is unnecessary to heat it again after the semiconductive tape is wound on it. Thus, the time required for shaping the cable connection part is shorter than that in the conventional method. In addition, the cable connection part is finely shaped and is therefore excellent in electric performance.

In this invention, in order to form the reinforcing insulation layer, a method of winding a tape of polymer material such as polyethylene, crosslinked polyethylene, ethylene-propylene copolymer or ethylene-vinylacetate on the conductor connection part can be employed. Alternatively, a method of pouring the same material into a metal mold can be employed. In the former method, foreign materials are introduced into the reinforcing insulation layer of the cable connection part, which may lower the electric performance. Therefore, in order to prevent this difficulty, it is desirable to employ the latter method.

In the invention, a heat-shrinkable insulation or semiconductive tube is placed over the reinforcing insulation layer by heating the tube. In this case, no particular treatment is necessary for the reinforcing insulation layer. That is, it is unnecessary to heat the reinforcing insulation layer which is being pressurized by a vulcanized rubber tape wound thereon or by the metal mold and thereafter to polish the surface of the reinforcing insulation layer. Thereafter, the cable connection part is pressurized. In this case, a method can be employed in which the cable connection part is sealed in a pressurizing container and a fluid is introduced, under pressure, into the pressurizing container.

In the invention, since the heat-shrinkable tube is in close contact with the surface of the reinforcing insulation layer with no gap therebetween, no liquid or gas bubbles enter the reinforcing insulation layer even if the latter is formed by winding the tape. Because the cable connection part can be pressurized in accordance with the above-described method, it is unnecessary to polish the surface of the reinforcing insulation layer, and accordingly the time required for achieving the cable connection is shorter. It is also possible to provide an excellent cable connection part stable in electrical performance.

In the invention, the method of heating the cable connection part in the case where a fluid is used as the pressurizing medium, is as follows: When the fluid is liquid such as silicon oil, then after being heated by a heating device the liquid is introduced into the pressurizing container to heat the cable connection part. However, it is preferable that the fluid be a gas. In this case, the cable connection part is heated by a cylindrical electric heater provided in the pressurizing container. Therefore, unlike the case where liquid is used, it is unnecessary to completely wipe off the liquid stuck on the cable connection part after the latter has been shaped by heating. Also, it is unnecessary to provide the heating device for heating the liquid.

It is more preferable that the gas is an inert gas such as nitrogen gas, because the cable connection part will not be oxidized even if heated.

This invention will be described with respect to the drawings and the description of the preferred embodiment which follows.

DESCRIPTION OF THE PREFERRED EMBODIMENT

Figure 1:
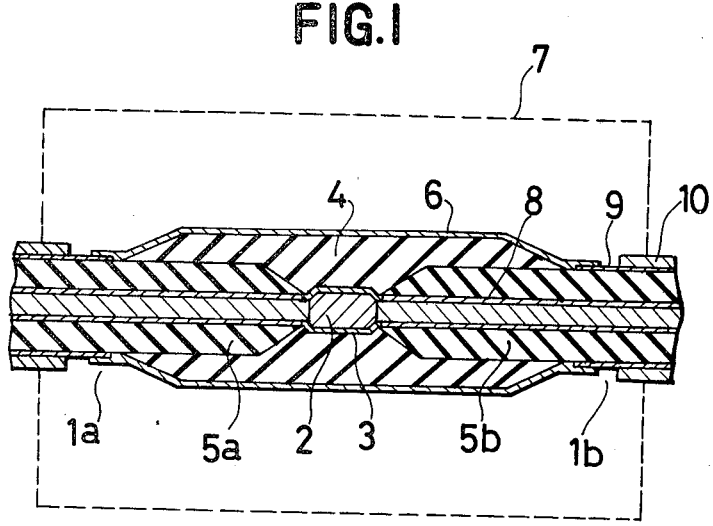
FIG. 1 is a longitudinal sectional view of a cable connection part which is obtained in accordance with a cable connecting method of this invention.

This invention will now be described with reference to the accompanying drawings. FIG. 1 is a longitudinal sectional view showing a cable connection part obtained according to the invention. In FIG. 1, reference characters 1a and 1b designate rubber- or plastic-insulated cables to be connected together. Element 2 is a conductor connection part and element 3, an internal semiconductive layer. The internal semiconductive layer 3 is provided by winding a semiconductive tape on the conductor connection part 2 or by heating a heat-shrinkable, semiconductive tube put on the conductor connection part 2. A reinforcing insulation layer 4 is provided over the conductor connection part 2 and the insulation layers 5a and 5b of the two cables 1a and 1b. Polymer materials for forming the reinforcing insulation layer 4 are, for instance, polyethylene, not crosslinked polyethylene blended with crosslinking agent, crosslinked polyethylene, ethylene-propylene copolymer and ethylene-vinyl-acetate copolymer. That is, insulation materials which are usually employed for forming ordinary cable insulation layers can be employed.

The reinforcing insulation layer may be formed as follows: Any one of the above-described polymer materials in the form of a tape is wound. More preferably, extrusion molding is employed by using a metal mold to make the reinforcing insulation layer 4 of the above-described polymer materials. In the latter method, no foreign materials are introduced into the reinforcing insulation layer, and the resultant surface is smoother than that in the former method. Accordingly, the insulation characteristic is improved. In addition, no gap is formed between the surface of the reinforcing insulation layer 4 and a thermally contractive, semiconductive tube 6.

Figure 2:
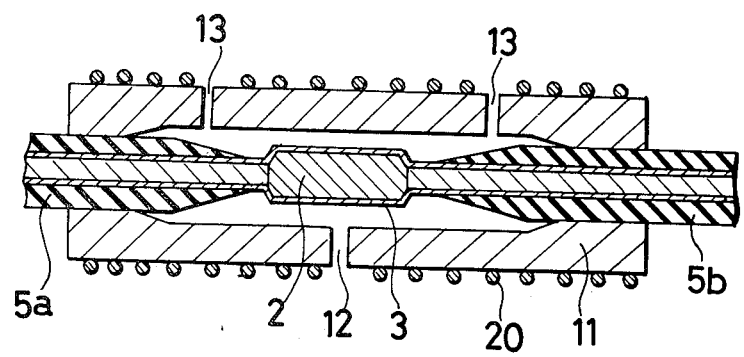
FIG. 2 is a longitudinal sectional view of a cable connection part which is formed by using a metal mold.

FIG. 2 is a longitudinal sectional view of the cable connection part, for a description of the latter method in which extrusion molding is employed by using a metal mold to make the reinforcing insulation layer 4 of the above-described polymer material. After the internal semiconductive layer 3 is provided over the conductor connection part 2, an extrusion molding metal mold 11 is set as shown in FIG. 2. The metal mold 2 is then heated at a suitable temperature by a heater 20, the polymer material is poured into the metal mold 2 through a material pouring inlet 12 by using, for instance, an extruding machine until it flows over overflowing holes 13.

In order to prevent the deformation of the cable insulation layers 5a and 5b, the temperature of the metal mold 11 must be not higher than 80° to 120° C. Accordingly, in the case where the polymer material pouring speed is low; that is, it takes a relatively long time to accomplish the pouring of the polymer material, the polymer material is cooled and solidified on the inner surface of the metal mold 11 or on the surface of the cables with which the polymer material is brought into contact. As a results, voids may be formed, which results in an unsatisfactory connection between the cable insulation layers 5a and 5b and the reinforcing insulation layer. This difficulty can be overcome by increasing the polymer material pouring speed and completing the pouring of the polymer material into the metal mold 11 before the polymer material is cooled down. More specifically, the pouring speed should meet the following formula:

$$Q/t > 5 (cc/min^2)$$

where, Q is the pouring speed (cc/min), and t is the time (min) required for pouring the polymer material. Then, the above-described problem can be solved either where it takes a relatively long time to accomplish the pouring of the polymer material because the reinforcing insulation layer is relatively thick and large in volume, or in the case where it is relatively thin and small in volume. If, in this method, the polymer material is allowed to flow over the overflowing holes 13 of the metal mold 11 for more than one minute after the polymer material has been poured into the metal mold, then the voids formed in the initial period of pouring the polymer material are allowed to flow away. Thus, more satisfactory results can be obtained. Molding the reinforcing insulation layer at the above-described pouring speed is effective especially in the case where, the polymer material to be poured into the metal mold is polyethylene with crosslinking agent. It is not allowed to increase the temperature of the material when the latter is poured into the metal mold in order to prevent the decomposition of the crosslinking agent.

Next, an insulation or semiconductive, heat shrinkable tube 6 is provided over the reinforcing insulation layer 4 as follows. The tube 6 is put on one of the cables 5a and 5b to be connected, before the conductors are connected. After the reinforcing insulation layer 4 has been formed, the tube is placed on the reinforcing insulation layer 4, and is then heat-shrunk by using a heater or a blow torch so that it is in close contact with the reinforcing insulation layer 4.

In view of electrical performance, it is preferable that the material of the heat-shrinkable insulation tube exhibit excellent adhesion properties to the reinforcing insulation layer 4. Therefore, the same materials for forming the reinforcing insulation layer 4, such as crosslinked polyethylene, ehylene-propylene copolymer and ehylene-vinyl-acetate copolymer, are employed as the materials of the tube. The material of the thermally contractive semiconductive tube used in the case where it is necessary to provide the external semiconductive layer on the cable connection part is prepared by adding carbon black to the above-described material which is used to form the thermally contractive insulation tube.

Figure 3:
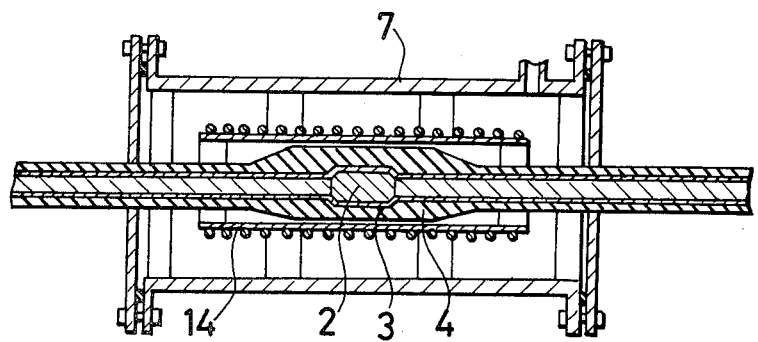
FIG. 3 is a longitudinal sectional view of a cable connection part which is formed by using a pressurizing container.

FIG. 3 is a longitudinal sectional view for a description of one of methods in which the cable connection part is heated under pressure. In this method, a pressurizing container is provided for heating the cable connection part under gas pressure. Referring to FIG. 3, in the cable connection part, the heat-shrinkable insulation or semiconductive tube is provided on the reinforcing insulation layer. The cable connection part is sealed in the pressurizing container 7. Nitrogen gas is introduced under pressure into the container and pressure is applied to the cable connection part.

Under this condition (the cable connection part being pressurized), the cable connection part is heated by radiation heat from a cylindrical electric heater 14 whose inside diameter is slightly larger than the outside diameter of the reinforcing insulation layer 4 in the heating container 7. It is desirable that the inside diameter of the cylindrical electric heater 14 be dimensioned so that the gap between the heater 14 and the surface of the cable connection part is not more than 10 mm after the latter has been thermally expanded. The reason for this is that, since the gap between the cylindrical electric heater 14 and the surface of the cable connection part is decreased, the heating efficiency is increased.

During the heating operation, the reinforcing insulation layer is softened and finally it hangs down. However, the inner wall of the cylindrical electric heater 14 prevents the reinforcing insulation layer from hanging down and being made accentric. Accordingly, it is preferable that the inner wall of the cylindrical electric heater 14 be coated with, for instance, ethylene tetrafluoride resin, so that the reinforcing insulation layer can be readily removed from the cylindrical electric heater 14.

The reinforcing insulation layer is bridged over the two cables in accordance with the above-described method, and thus the cable connection is achieved.

In order to clarify the effects of the invention, the invention will be further described with reference to the following examples.

Illustrative Example 1 is for comparing a cable connection part without an external semiconductive layer, which is formed by the method of the invention with that formed by other methods different from the method of the invention.

ILLUSTRATIVE EXAMPLE 1

Examples 1 and 2

Crosslinked polyethylene insulation cables having conductors 150 mm$^2$ in cross-sectional area and insulation layers 7 mm in thickness were connected together. A reinforcing insulation layer 10 mm in thick was formed by winding a tape of polyethylene with crosslinking agent (dicumyl peroxide) on the cable connection part (Example 1) or it is formed by extrusion-molding the same material (Example 2). Then, a heat shrinkable insulation tube of crosslinked polyethylene (the inside diameter being 50 mm before shrinkage and 20 mm after shrinkage) was placed over the reinforcing insulation layer by thermally contracting it with a blow torch. The cable connection part thus obtained was placed in the pressurizing container. While nitrogen gas was introduced into the container under a pressure of 5 kg/cm$^2$, the cable connection part was heated at 210° C. for 1.5 hours by the cylindrical electric heater provided in the container, so that the reinforcing insulation layer was bridged over the two cables, and the cable connection was achieved.

Comparison Examples 1 and 2

Cables similar to those in Examples 1 and 2 were used. A reinforcing insulation layer 10 mm in thickness was formed by winding a tape of polyethylene with crosslinking agent (dicumyl peroxide) on the connection part (Comparison Example 1) or by extrusion-molding the same material (Comparison Example 2). A vulcanized rubber tape was strongly wound on the reinforcing insulating layer to a thickness of 10 mm. Then, the cable connection part was heated at 210° C. for four hours. Thereafter, the vulcanized rubber tape was removed from the cable connection part, and the reinforcing insulation layer was machined to be smooth. Thus, the cable connection was achieved.

Comparison Examples 3 and 4

Cables similar to those in Examples 1 and 2 were used. A reinforcing insulation layer 10 mm in thickness was formed by winding a tape of polyehylene with crosslinking agent (dicumyl peroxide) on the connection part (Comparison Example 3) or by extrusion-molding the same material (Comparison Example 4). Similarly as in Concrete Examples 1 and 2, the cable connection part was heated at 210° C. for 1.5 hours under nitrogen gas pressure (5 kg/cm$^2$), so that the reinforcing insulation layer was bridged over the cables. Thus, the cable connection was achieved.

The cable connections parts obtained in accordance with the methods described in Examples 1 and 2 and Comparison Examples 1 through 4 were subjected to the following tests with the results as indicated in Table 1.

(1) AC initial breakdown test—Voltage is applied by stepwisely increasing by 5 kV every 30 minutes from the start voltage. When breakdown occurs, the voltage is measured.

(2) Deformation of the reinforcing insulation layer—The cable connection part is cut at the center, and the maximum and minimum values of the wall thickness of the reinforcing insulation layer are measured.

As is apparent from Table 1, the deformation of the reinforcing insulation layer in Examples 1 and 2 are less than that in Comparison Examples 1 through 4, and the electrical performance in Examples 1 and 2 are superior to that in Comparison Examples 1 through 4. In Examples 1 and 2, it was unnecessary to polish the surface of the reinforcing insulation layer. Therefore the time required for cable connection in Examples 1 and 2 was shorter than that in Comparison Examples 1 through 4.

TABLE 1

| | | | Example 1 | Example 2 | Comparison Example 1 | Comparison Example 2 | Comparison Example 3 | Comparison Example 4 |
|---|---|---|---|---|---|---|---|---|
| Cable connecting method | Reinforcing insulation layer | | Tape, wound | Extrusion molding | Tape, wound | Extrusion molding | Tape, wound | Extrusion molding |
| | Heat-shrinkable insulation tube | | Used | Used | Not Used | Not Used | Not Used | Not Used |
| | | Pressurizing method | Nitrogen gas (5 kg/cm$^2$) | Nitrogen gas (5 kg/cm$^2$) | Vulcanized rubber tape, wound | Vulcanized rubber tape, wound | Nitrogen gas (5 kg/cm$^2$) | Nitrogen gas (5 kg/cm$^2$) |
| | Heat Forming Condition | Heating | 210° C. | 210° C. | 210° C. | 210° C. | 210° C. | 210° C. |

TABLE 1-continued

|  | | Example 1 | Example 2 | Comparison Example 1 | Comparison Example 2 | Comparison Example 3 | Comparison Example 4 |
|---|---|---|---|---|---|---|---|
| | condition | 1.5 hr | 1.5 hr | 4 hr | 4 hr | 1.5 hr | 1.5 hr |
| | Reinforcing insulation layer surface state after shaped by heating | Smooth | Smooth | Greatly uneven | Greatly uneven | Rather uneven | Smooth |
| | Polishing of reinforcing insulation layer surface | Not needed | Not needed | Needed | Needed | Not Needed | Not Needed |
| Test result | Deformation of reinforcing insulation layer — max | 12 mm | 11 mm | 11 mm | 12 mm | 15 mm | 15 mm |
| | min | 9 mm | 9 mm | 8 mm | 8 mm | 6 mm | 7 mm |
| | AC initial breakdown value | 210 kV | 250 kV | 160 kV | 170 kV | 50 kV | 150 kV |

Illustrative Example 2 is for comparing a cable connection part with an external semiconductive layer, which is formed according to the method of the invention, with that formed by other methods different from the method of the invention.

ILLUSTRATIVE EXAMPLE 2

Examples 3 and 4

Crosslinked polyethylene insulation cables having external semiconductive layers, conductors 150 mm² in cross-sectional area, and insulation layers 7 mm in thickness were connected. A reinforcing insulation layer 10 mm in thickness was formed by winding a tape of polyethylene with crosslinking agent (dicumyl peroxide) on the connection part (Example 3) or by extrusion-molding the same material (Example 4). A heat shrinkable semiconductive tube with crosslinked polyethylene as its base material (the inside diameter being 50 mm before contraction and 20 mm after contraction, and the conductivity in surface resistance being $3 \times 10^{14}$ with the electrodes set 20 mm apart) was heat-shrunk on the reinforcing insulation layer by using a blow torch, thereby to form the external semiconductive layer. The cable connection part thus formed was heated at 210° C. for 1.5 hours under nitrogen gas pressure (5 kg/cm²), so that the reinforcing insulation layer was cross-linked. Thus, the cable connection was achieved.

Comparison Example 5 and 6

Cables similar to those in Examples 3 and 4 were used. A reinforcing insulation layer 10 mm in thickness was formed by winding a tape of polyethylene with crosslinking agent on the connection part (Comparison Example 5) or by extrusionmolding the same material (Comparison Example 6). A vulcanized SBR tape was wound on the reinforcing insulation layer. The cable connection part thus formed was heated at 210° C. for 1.5 hours under nitrogen gas pressure (5 kg/cm²). Then, the vulcanized SBR tape was removed from the cable connection part, and thereafter the surface of the reinforcing insulation layer was polished. After this, a semiconductor tape was wound on the reinforcing insulation layer, and the cable connection part was heated at 160° C. for two hours to form an external semiconductive layer. Thus, the cable connection was completed.

The cable connection parts obtained in accordance with the methods described in Examples 3 and 4 and Comparison Examples 5 and 6 were subjected to electrical performance tests similar to those in Example 1. The results are as indicated in Table 2.

As is clear from Table 2, in Examples 3 and 4, thermal formation of the reinforcing insulation layer and thermal formation after the provision of the external semiconductive layer can be carried out simultaneously. Accordingly time required for cable connection was shorter than that in Comparison Examples 5 and 6. In addition, the electrical performance in Examples 3 and 4 was superior to that in Comparison Examples 5 and 6.

TABLE 2

| | | Example 3 | Example 4 | Comparison Example 5 | Comparison Example 6 |
|---|---|---|---|---|---|
| Cable connection method | Reinforcing insulation layer | Tape, wound | Extrusion molding | Tape, wound | Extrusion molding |
| | External semiconductive layer | heat shrinkable tube | heat shrinkable tube | Tape, wound | Tape, wound |
| | Heat-forming of reinforcing insulation layer | Shaped simultaneously at 210° C. under nitrogen gas pressure for 1.5 hours | Shaped simultaneously at 210° C. under nitrogen gas pressure for 1.5 hours. | Vulcanized rubber tape, wound 210° C. 1.5 hours | Vulcanized rubber tape, wound 210° C. 1.5 hours |
| | Heat-forming after the provision of reinforcing insulation layer | | | 160° C. 2 hours | 160° C. 2 hours |
| | Polishing of reinforcing insulation layer surface | Not needed | Not needed | Needed | Needed |
| | State of interface between reinforcing insulation layer and external semiconductive layer | Rather uneven | Smooth | Rather uneven | Rather uneven |
| | AC initial breakdown value | 230 kV | 250 kV | 160 kV | 190 kV |

Illustrative Example 3 is for select a suitable material pouring speed in the case where the polymer material is subjected to extrusion molding by using a metal mold as one of the methods of forming the reinforcing insulation layer according to the invention.

ILLUSTRATIVE EXAMPLE 3

Crosslinked polyethylene insulation cables having consuctors 150 mm$^2$ in cross-sectional area and insulation layers 7 mm in thickness, and crosslinked polyethylene insulation cables having conductors 1,000 mm$^2$ in cross-sectional area and insulation layers 20 mm in thickness were connected together, respectively. Reinforcing insulation layers 10 mm and 20 mm in thickness were formed by pouring polyethylene with cross-linking agent (dicumyl peroxide) at pouring speeds indicated in Table 3 below into metal molds preheated at 100° C., respectively for the different kinds of cables described above. Furthermore, after heat-shrinkable insulation tubes were thermally contracted on the reinforcing insulation layers, the cable connection parts were heated at 200° C. for two hours and eight hours, so that the reinforcing insulation layers were cross-linked, respectively for the different kinds of cables. Thus, the cable connections were achieved, respectively.

These cable connection parts were subjected to the AC initial breakdown value measuring test, and the results are as indicated in Table 3 below.

TABLE 3

| | Comparison Example 7 | Example 5 | Example 6 | Comparison Example 8 | Example 7 |
|---|---|---|---|---|---|
| Cable conductor sectional area | 150 mm$^2$ | 150 mm$^2$ | 150 mm$^2$ | 1000 mm$^2$ | 1000 mm$^2$ |
| Cable insulation layer thickness | 7 mm | 7 mm | 7 mm | 20 mm | 20 mm |
| Pouring speed Q(cc/min) | 30 | 40 | 100 | 150 | 180 |
| Time required for pouring t (min) | 10 | 7.5 | 3.2 | 35 | 30 |
| Q/t (cc/min$^2$) | 3 | 5.3 | 31 | 4.3 | 6 |
| Time for overflowing (min) | 2 | 0 | 1 | 0 | 0 |
| Interface adhesion state | x | O | O | Δ | O |
| AC initial breakdown value (kV) | 80 | 180 | 230 | 250 | 450< |

Note: Interface adhesion state—The cable connection part was cut in the form of a sheet in such a manner that the interface between the reinforcing insulation layer and the cable insulation layer was substantially at the center of the thickness of the sheet. The interface adhesion state was determined from whether or not the two layers came off each other by bending the sheet ten times. In Table 3, the mark (x) indicates that the two layers came off each other, the mark (Δ) indicates that the two layers locally came off each other, and the mark (O) indicates that the two layers did not come off each other.

As it apparent from Table 3, in the cable connection part (Examples 5, 6 and 7) having the reinforcing insulation layer which was formed by selecting the pouring speed so that the ratio Q/t of the pouring speed Q (cc/min) to the time t (min) required for pouring was not less than five (5), the adhesion state in the interface between the reinforcing insulation layer and the cable insulation layer was satisfactory, and accordingly the AC initial breakdown value was higher. The AC initial breakdown value was further increased by allowing polyethylene with crosslinking agent to flow over the overflowing holes of the metal mold.

What is claimed is:

1. A method of connecting two cables each having an internal conductor comprising the steps of: connecting spaced ends of said conductors with a conductive connector; forming a reinforcing insulation layer over said connector for the conductors of said cables by pouring insulation material in a metal mold at a material pouring rate corresponding to the ratio (Q/t) of an insulation material pouring speed Q (cc/min) to time t (min) required for pouring said insulation material into said metal mold, wherein said ratio is not less than five; said insulation material comprising polyethylene blended with a crosslinking agent; providing a heat-shrinkable tube on said reinforcing insulation layer by heating said heat-shrinkable tube to form a cable connection part; and forming said cable connection part by heating while being pressurized in a fluid medium.

2. A method as claimed in claim 1, wherein said heat-shrinkable tube is made of polymer insulation material.

3. A method as claimed in claim 2, wherein said polymer insulation material is crosslinked polyethylene.

4. A method as claimed in claim 2, wherein said polymer insulation material is ethylene-propylene copolymer.

5. A method as claimed in claim 2, wherein said polymer insulation material is ethylene-vinyl-acetate copolymer.

6. A method as claimed in claim 1, wherein said heat-shrinkable tube is made of polymer semiconductive material.

7. A method as claimed in claim 6, wherein said polymer semiconductive material is crosslinked polyethylene containing carbon black.

8. A method as claimed in claim 6, wherein said polymer semiconductive material is ethylene-propylene copolymer containing carbon black.

9. A method as claimed in claim 6, wherein said polymer semiconductive material is ethylene-vinyl-acetate copolymer.

10. A method as claimed in claim 1, wherein said crosslinking agent is dicumyl peroxide.

11. A method as claimed in claim 1, wherein the insulation material of said reinforcing insulation layer is ethylenepropylene copolymer.

12. A method as claimed in claim 1, wherein the insulation material of said reinforcing insulation layer is ethylenevinyl-acetate copolymer.

13. A method as claimed in claim 1, wherein said insulation material is poured into said metal mold unitl said insulation material is allowed to flow over an overflowing hole formed in said metal mold.

14. A method as claimed in claim 1, wherein said fluid medium is a liquid.

15. A method as claimed in claim 14, wherein said liquid medium is silicon oil.

16. A method as claimed in claim 1, wherein said fluid medium is inert gas.

17. A method as claimed in claim 16, wherein said inert gas is nitrogen gas.

18. A method as claimed in claim 1, wherein said cable connection part is shaped by heating while pressurizing said cable connection part by said fluid; further comprising the steps of sealing said cable connection part in a pressurizing container; pressurizing said cable connection part by gas introduced into said pressurizing container and; heating by a cylindrical electric heater provided in said pressurizing container, the inside diameter of said cylindrical electric heater being larger than the outside diameter of said cable connection part.

19. A method as claimed in claim 18, wherein the inside diameter of said cylindrical electric heater is selected so that, after said cable connection part has been thermally expanded, the gap between said cylindrical electric heater and said cable connection part is not more than 10 mm.

* * * * *